April 23, 1946.  M. N. PARTRIDGE  2,399,057
SIGNAL
Filed Aug. 29, 1942   2 Sheets-Sheet 2
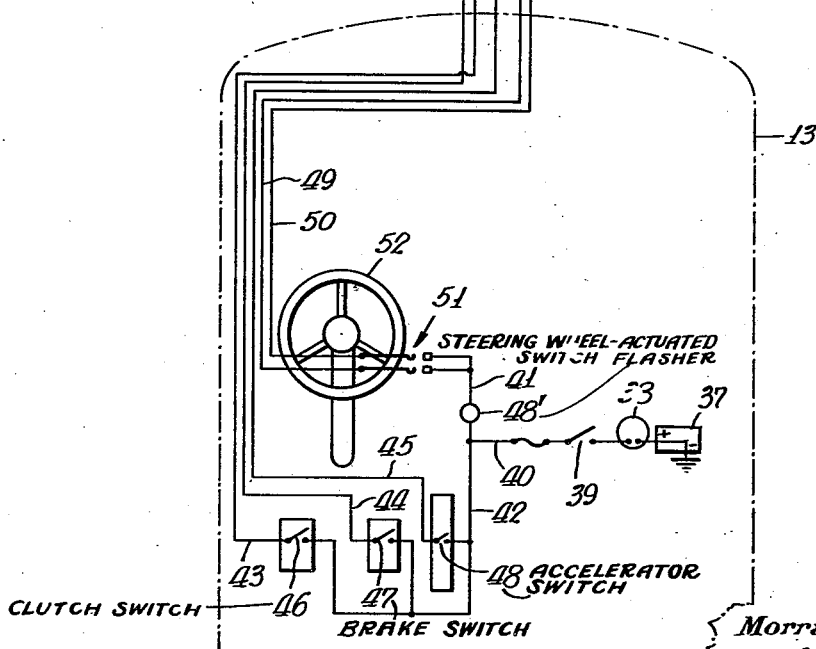
INVENTOR
Morris N. Partridge
BY
ATTORNEYS Patented Apr. 23, 1946

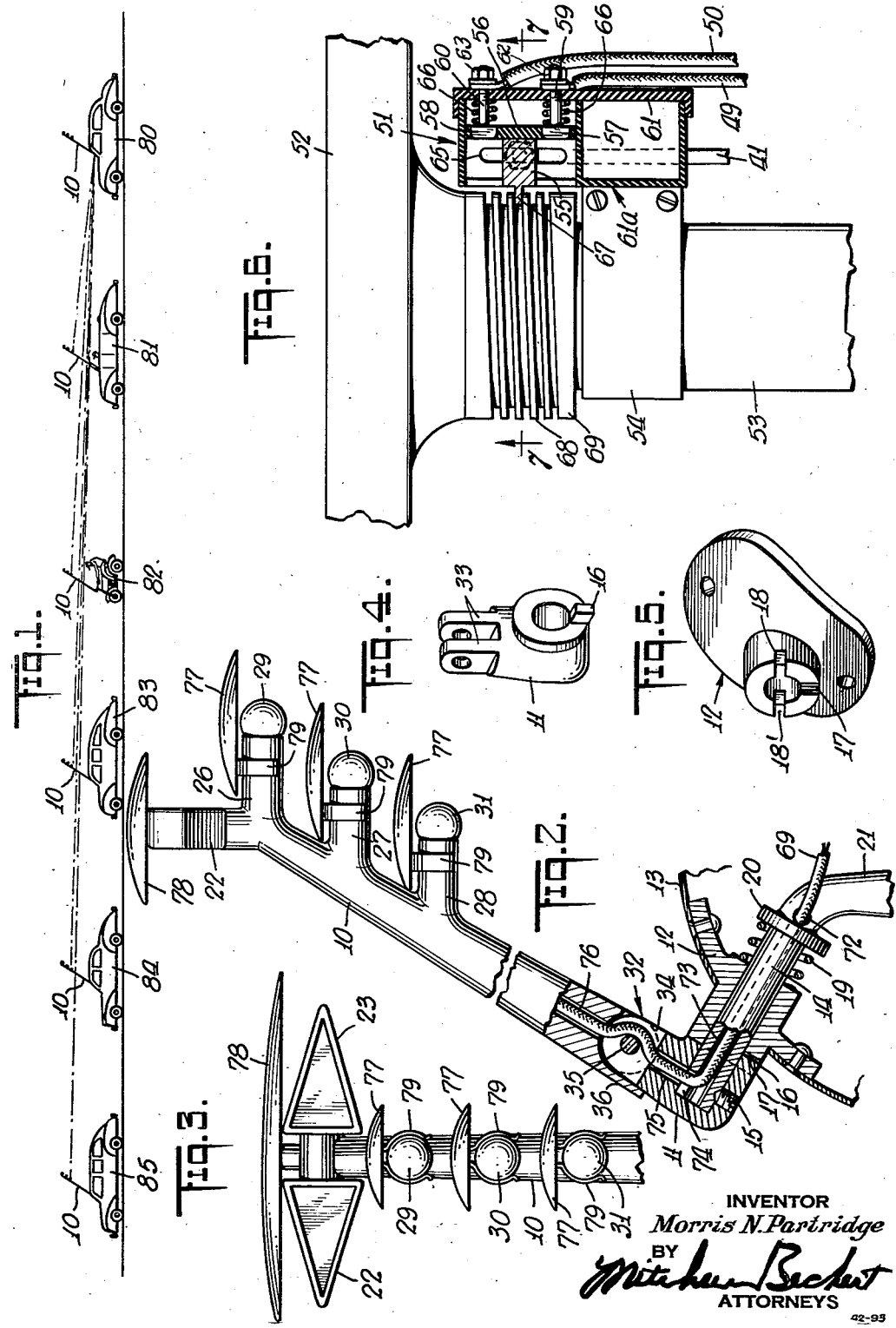

2,399,057

UNITED STATES PATENT OFFICE 2,399,057

SIGNAL

Morris N. Partridge, Jackson Heights, N. Y.

Application August 29, 1942, Serial No. 456,595

2 Claims. (Cl. 177—329)

This invention relates to improvements in signalling systems especially adapted for use on motor vehicles and also on other motor driven carriers, and more particularly to an improved signalling system adapted to indicate to observers to the rear (or sides and possibly front) of a vehicle carrying the system the state of operation of such vehicle, including the showing of right and left turns.

An important object of the invention is to provide a novel and advantageous signalling system of the general character specified.

Another object is to provide a system of the character described adapted to display its signals above the top of a moving vehicle on which it is mounted and to be seen for a considerable distance over "intervening" vehicles or objects.

Another object is to provide a signalling device which may be held at such a height that the signalling thereby may be observed over intervening objects or vehicles or may be lowered below such raised position because of insufficient headroom or for other reasons.

A further object is to provide an improved signalling system for a vehicle which indicates to the drivers of other vehicles and to pedestrians the controls which are "in use" or which are "not in use" on the vehicle equipped with this device.

Another object is to provide a signalling system of the character described which is fully automatic and in which the signals will operate when the vehicle is standing still as well as when it is in motion or in the process of starting or stopping.

According to one form of carrying out the invention there may be provided a mast projecting above the top of the vehicle and carrying at its top a turn-indicating signal comprising two horizontal arrows pointing in opposite directions, two electric lamps to be lighted one at a time by the turning of the steering wheel in one direction or the other to show a light at the proper arrow, red or yellow to the rear and yellow to the front, if shown at the front, and, in order downward below the turn signal, a red light to be turned on by depression of the brake pedal to brake the car, an amber light to be lighted by depressing the clutch pedal, and a green light to be turned on by depressing the accelerator pedal. These lights cannot cause confusion in that, in traffic lights, "red" means "stop," "amber" means "caution" or "slow," and "green" means "go."

The mast may be so mounted that it may be lowered, for example, to enable the car to be driven into a garage with a relatively low door, and latching means may be provided to hold the mast in either raised or lowered position. The mast may also be provided with a hinge to enable it to be bent back in the event that it strikes an object underneath which the car is driven, thus avoiding or minimizing damage.

Shields or shades may be mounted above the signal lights, one above each of the control lights controlled by the brake pedal, the clutch pedal and the accelerator and one above the two signal "arrow" lights indicating the direction in which the car is to turn. These shields may be directly above the corresponding lights and may be provided with concave faces towards said lights, so as to prevent the lights from being seen except from points more or less below the level of planes drawn horizontally through said lights. This arrangement of shields adapts the signals for use during "blackouts" or "air-raids." Thus drivers and traffic to the rear or side would be able to see such signal lights and thus avoid running into the cars ahead but the shields would definitely prevent the signal lights from being seen from above as by enemy aircraft looking for targets. These shielded lights would also prevent cars at the side from running into cars equipped with these devices.

One of the advantages of this type of signal is to show to drivers of vehicles and to pedestrians at the rear of the car carrying the signal, the controls which are "in use" or which are "not in use" on a vehicle equipped with this device. Another advantage of the device of the present invention is that the signal indicates a turn to the right or to the left, as indicated visually by lights and automatically shows at the exact instant when the controls are placed "in use" or "out of use" position. Due to the elevated position of the signal lights above the top of the vehicle upon which the device is mounted the visibility is such that the signal lights may be seen by several cars over the tops of intervening cars, all of which are in line.

The visibility to a driver of the signal lights of several cars to the front over the tops of intervening cars enables the driver at the rear to be prepared to stop or slow down when the signal lights on a car some distance in advance indicate slowing down, stopping or turning, thus reducing the probability of rear-end collisions which are particularly severe when several cars pile up against each other.

Another advantage of such visibility from the rear is that it avoids delay in starting cars. Frequently when a line of cars is stopped each driver makes preparation to start only when the next preceding car starts, thus adding progressively to the delay in starting cars some distance back. By observing the signals on cars considerably in advance a driver at the rear may be prepared to start his car at substantially the same time as the one immediately ahead of him, thus greatly reducing the delay.

The operation of the signalling device is fully automatic due to its construction and wiring system and such that the signal lights will operate when the vehicle is standing still as well as when it is in motion or in a process of starting or stopping. This operation, however, can be changed by opening a manual switch if desired.

The control on the majority of present-day cars include the brake pedal, the clutch pedal and accelerator or pedal controlling the supply of gasoline. In the case of the "fluid" or "hydraulic" drive which is used on many cars the control lights, wiring and switches which are operated by the foot pedals corresponding to the foot brake and foot gas control would in most cases be all that would be needed or used on this type of car or vehicle. However, the signal would need to be adapted to each vehicle and might vary somewhat with makes of cars and types of controls used thereon.

It will be evident that the device of the present invention is particularly applicable for use on motor vehicles traveling on the highways, such as passenger automobiles, trucks, buses, taxi cabs, motor-drawn trailers, motorcycles, and tanks. Although for ordinary motor vehicles it is desirable to mount the mast at the front, in the case of a truck or trailer it may be better to mount the mast at the rear. It will also be evident that a signal of this type might also be used to advantage, although in different ways, with trains, airplanes, boats, etc., so as to indicate to obesrvers at a distance, controls which are "in use" or which are "not in use."

Other objects, features and advantages will appear upon consideration of the following detailed description and of the drawings in which Fig. 1 is a diagrammatic view illustrating the use of one form of signal of the present invention on different types of motor vehicles;

Fig. 2 is a side elevation of one embodiment of the signalling device of the present invention, parts being broken away to show the underlying structure;

Fig. 3 is a rear view of the upper part of the structure shown in Fig. 2;

Fig. 4 is a perspective view of a part of a pivotal support for the lower end of the mast;

Fig. 5 is a perspective view of said pivotal support mounted on the top of a motor vehicle;

Fig. 6 is a fragmentary view showing the upper part of a steering column and a steering-wheel-controlled switch carried thereby;

Fig. 7 is a section taken on the line 7—7 of Fig. 6; and

Fig. 8 is a wiring diagram of the electrical system for operating the signalling devices.

Referring to the drawings, the supporting structure for the signalling devices may be in the form of a hollow mast 10 and mounted on a base 11. The base 11 forms parts of a pivotal support for the mast, such pivotal support also including a bracket 12 mounted on an automobile body 13 and connected with the base 11 by means of a pivot 14 projecting through a bore in the bracket 12 into a corresponding bore in the base 11 and being secured against rotation in said base 11 by means of a set screw 15. Such pivotal connection enables the mast 10 to be turned from an upright position downwardly to a position in which it will be substantially at the level of the top of the car.

In order to hold the mast 10 in either raised or lowered position the base 11 is provided with a rearwardly extending lug 16 which may fit into a notch 17 in the bracket 12 to hold the mast 10 in a vertical position or into a notch 18 to hold the mast 10 in a horizontal position. In order to hold the lug 16 in either one of the notches 17 and 18 a spring 19 is interposed between the bracket 12 and a collar 20 at the inner end of the pivot 14 so that by use of a handle 21 at the inner end of the pivot 14, the pivot 14 may be forced forwardly to a sufficient extent to withdraw the lug 16 from the notch 17 and the mast 10 may then be turned to a horizontal position with the lug 16 opposite the notch 18 so that when forward pressure on the handle 21 is released the spring 19 will project the lug 16 into the notch 18 and hold the mast in a substantially horizontal position. It should be understood that another notch 18' similar to 18 might be used to afford parking protection. Thus the mast may be held in position to show a parking or other signal at either the right or the left side of the vehicle and at a height to be easily seen.

At the top of the mast 10 there is provided a turn signal including a left-hand signal 22 and a right-hand signal 23 with light transmitting members in the shape of arrows which are illuminated respectively by electric lights 24 and 25 (see Fig. 8). Beneath the turn signal the mast 10 is provided with rearwardly extending tubular branches 26, 27 and 28, numbered downwardly from the turn signal. At the rear ends of the branches 26, 27 and 28 there are respectively a red light 29, an amber light 30 and a green light 31. Obviously these colors may be produced by using bulbs with colored glass or by using white light bulbs behind suitably colored windows.

In order to avoid damage to the mast 10 and the signalling means carried thereby by striking the mast against some object beneath which the car is passing, the mast 10 may be connected to its base 11 by a bolt hinge 32, comprising two upright lugs 33 at the upper end of the base 12 and two downwardly extending lugs 34 formed at the sides of the mast 10 and fitting against the flat outer faces of the lugs 33. The hinge is completed by means of a bolt 35 passing through suitable openings in the lugs 33 and 34. The lugs 34 may have rounded lower ends to facilitate the bending of the hinge. The degree of tightness of the bolt may determine the resistance to bending at the hinge 32. The limiting position of the mast 10 towards the front may be determined by means of a finger 36 at the front of the mast 10 and extending downwardly so as to engage the front of the base 11. The mast may be yieldably held in the upright position by spring means adapted to permit the mast to be swung either forwardly or rearwardly from the upright position, thus minimizing damage which may result from striking the mast against objects either in forward or rearward movement of the car.

As illustrated in Fig. 8 and other figures, current for the electrical system is supplied from a storage battery 37 and passes through an ammeter 38 and a manual switch 39 and conductor 40. From the conductor 40 current is supplied in parallel to a conductor 41 and a second conductor 42. From the conductor 42 current may be supplied in parallel to conductors 43, 44 and 45, of which conductor 43 includes a switch 46 caused to close upon throwing out of the clutch, conductor 44 includes a switch 47 caused to close upon operating the foot brake, and conductor 45 includes a switch 48 closed by pressing down the accelerator. The conductor 44 furnishes current to the red light 29 or "stop" signal, the conductor 43 supplies current to the amber light 30 or "caution" signal, and the conductor 45 supplies current to the green light 31 or "go" signal, the current from the lamps passing to a grounded conductor 47'.

From the conductor 41 which contains a flashing device 48' the current may be passed in parallel through either one of two conductors 49 or 50 of which the first supplies current to the lamp 24 which is also connected to the grounded wire 47, and the conductor 50 which supplies current to the lamp 25 connected to the grounded conductor 47. The supply of current from the conductor 41 to the conductors 49 and 50 is determined by means of a switch 51 controlled by a steering wheel 52 in accordance with the turning of the wheel 52 to the left or to the right of its normal straight position.

The switch 51 may be constructed and operated as shown in Fig. 6 in which the switch is shown as mounted on the steering column 53 by means of a bracket 54. The switch 51 comprises a movable switch member 55 mounted for upward and downward movement in suitable guiding means. In the central position of the wheel 52 the switch member 51 engages a member 56 of insulating material, but if the wheel be turned to the left the switch member 55 will be moved downwardly into engagement with a metal contact member 57 connected to the conductor 49, and if the wheel be turned to the right the switch member 55 will be moved into contact with a metal contact member 58 connected to the conductor 50. The contacts 57 and 58 may be the heads of bolts 59 and 60 passing through a member 61 of insulating material which serves as a cover for a switch box 61a carried by bracket 54, and these bolts through nuts 62 and 63 may serve to connect the contacts 57 and 58 to the conductors 49 and 50. Also the conductor 41 may be connected with the switch member 55 by means of a screw device 64 (Fig. 7) passing through a slot 65 in insulating material forming a side of the switch box.

Springs 66 hold the insulating material 56 and contacts 57 and 58 yieldingly in position to press against switch member 55 and hold a lug 67 thereon in the groove of a screw threaded portion 68 of a member or sleeve 69 mounted on the steering shaft 70 to turn therewith but insulated from the frame. This result may be attained by making the sleeve 69 of insulating material. Obviously the lighting of the right and left direction-indicating arrows may be effected in many ways with or without manual control.

As shown in Fig. 2, all of the conductors 43, 44, 45, 49 and 50 may be included in a single cable 69 entering the handle 21 through an opening 72 and extending through an axial passage 73 in the pivot 14, a side opening 74 in the forward end of the pivot, and an axial passage 75 in the upright branch of base 11, around the bolt 35 between lugs 33, and then through an axial passage 76 in the mast 10 to the lamps.

Use of the signalling means during blackouts is made possible by placing shields 77 over the lights 29, 30 and 31, and by placing a larger shield 78 over the turn signals 24 and 25, the shields 77 being conveniently held in place on mast branches 26, 27 and 28 by spring clips comprising spring arms 79. The shields are preferably concave at their lower surfaces and are positioned substantially parallel to the road so that, at least where the road is horizontal, the signal lights will be visible to car drivers to the rear who are looking up from a level below that of the observed light and its shield. However, the small signal lights will not show to aircraft whose occupants are looking down from a level above the level of the signal lights.

The use of the signalling means on cars on a flat road is illustrated in Fig. 1 which shows a plurality of motor vehicles numbered from right to left 80, 81, 82, 83, 84 and 85, each of which is equipped with a mast 10 carrying the signal lights. Fig. 1 also clearly shows the lines of sight from each vehicle to the signals of the vehicle or vehicles to the front thereof. It should be noted that vehicle 82 is a motorcycle. The vehicles may be of a great variety of types, for example certain vehicles might be trucks, trailers, or tanks. When trucks or trailers are in use it may be desirable to place the signals back from the front of the body.

An important advantage of my signalling apparatus is found in connection with various situations, for example, where there may be long lines of large van-type trucks proceeding in each direction in the traffic lanes next to lines of cars parked at the curb on each side of the street. These van-trucks due to the size of their bodies, often completely hide the street traffic lights mounted at each street intersection. Vehicles moving in the center lines between these two lines of van-trucks cannot see the traffic lights and must depend upon the vehicles ahead starting and stopping in order to be informed as to whether the traffic lights are showing red, amber or green and indicating "stop," "caution" or "go." The signal of the present invention overcomes this trouble as with the use of this signal the position or color of the traffic lights is instantly automatically relayed to other cars and traffic congestion will be aided in starting and stopping.

The signals of this system can be seen to each side as well as to the rear, and they might also be constructed so as to be seen from the front if this arrangement were not contrary to the motor vehicle laws of which many prohibit the showing of any light, except white or yellow light, directly forward on any vehicle except emergency equipment such as ambulances etc. Such transmission of signals would afford the maximum amount of protection, service, cooperation and benefit.

It may be desired to show a red light when parked, and this result may be attained by use of a manual or kick switch. The signal system might also be modified by providing a switch operated by the reversing movement of the reverse gear shift, so that when the car was in reverse gear and the gas pedal was depressed, not only would the green light show to indicate such depression but the red light would also be on to indicate that he car was being backed up. The meaning of this combination of lights would soon become common knowledge. Another manner of raising and lowering the mast 10 would involve sliding it up and down in suitable supporting means, for example in a weather tight tube in the front of the car top.

The signalling device of the present invention being visible to practically all following cars makes possible cooperation between all of the drivers and this prevents accidents and traffic congestion. Instantaneous warning is given as to what a vehicle is doing or is about to do.

The signalling device of this invention serves to warn drivers of the intervening distances between vehicles ahead. These conditions will be shown to a great extent by the number of signals visible ahead. The closer a driver is to the car ahead, the smaller the number of signal lights which will be visible ahead. This is based on normal highway traffic. The relative heights of the signals will serve to show the distances between cars ahead.

It should be understood that the term "motor vehicle" should be construed as covering not only motor vehicles as ordinarily understood, but also such motor vehicles with attached trailers, especially where the signals would of necessity be mounted on the trailers.

It should be understood that various changes may be made in the construction and arrangement and that various features may be used without others without departing from the true scope and spirit of the invention.

I claim:

1. The combination with a motor car having a body and driver-controlled car-controlling means, of an electrical signalling system including electrically operated signal means to indicate the condition of said car-controlling means and switch means operated by said car-controlling means to control the operation of said signal means, a mast supporting said signal means and movable to shift said signal means between a raised position above the top of said body for signalling purposes and a lowered position where the signal means will clear obstructions, a pivot fixed to the lower end of said mast substantially perpendicular thereto, a bracket fixed to said body and having a cylindrical axial passage in which said pivot is mounted, and means including a handle attached to said pivot at the interior of said body for raising and lowering the mast and securing it in either position.

2. The combination with a motor car having a body and driver-controlled car-controlling means, of an electrical signalling system including electrically operated signal means to indicate the condition of said car-controlling means and switch means operated by said car-controlling means to control the operation of said signal means, a mast supporting said signal means, means for shifting said mast to a raised position to position said signal means so far above the car body as to render said signal means visible to the driver of a following motor car above the tops of several intervening cars, and for lowering said mast to an inoperative position so as to clear overhead obstructions.

MORRIS N. PARTRIDGE.